Jan. 25, 1927. 1,615,812
R. T. ROMINE
APPARATUS FOR HANDLING METAL
Filed March 11, 1926 8 Sheets-Sheet 3
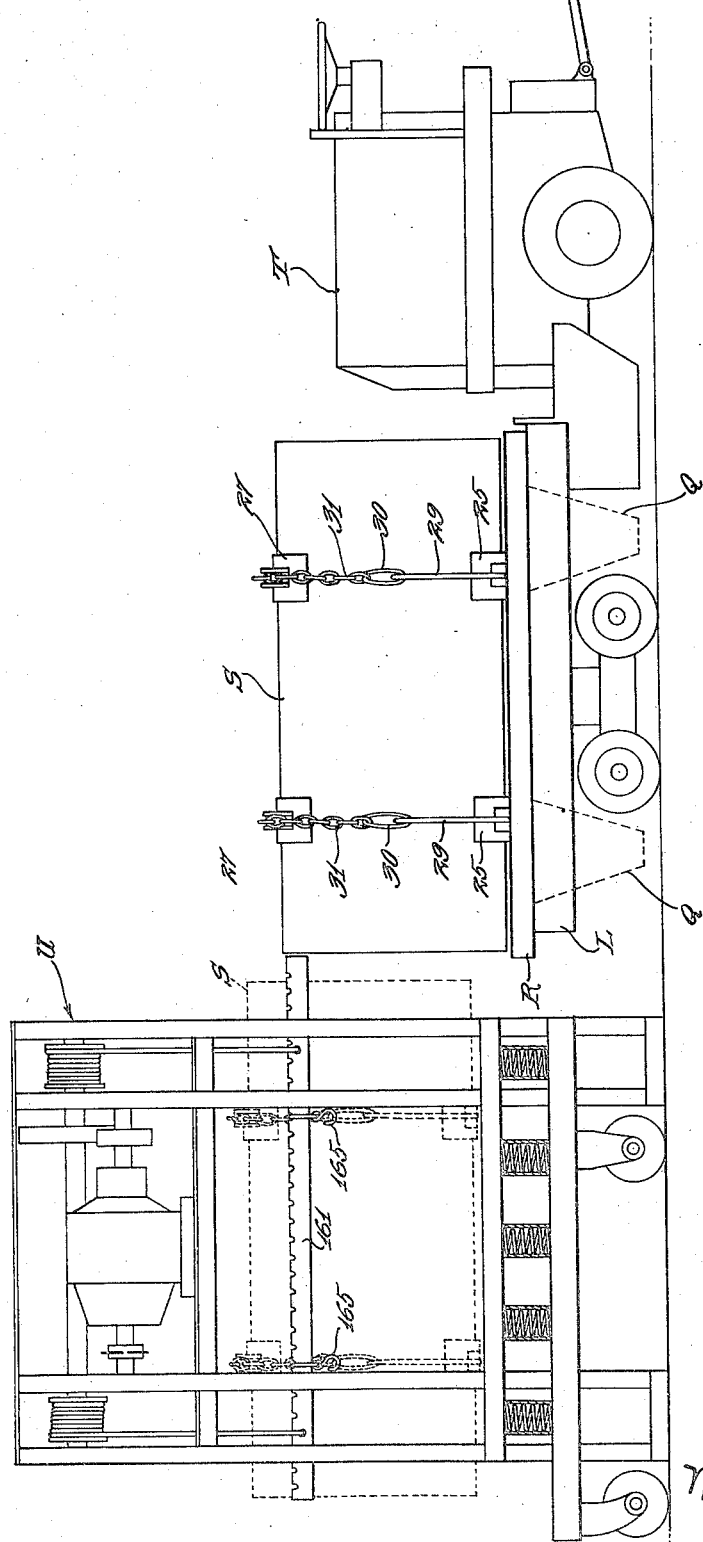
INVENTOR:
R. T. Romine
Macleod, Calver, Copeland & Dike
Attys Jan. 25, 1927.

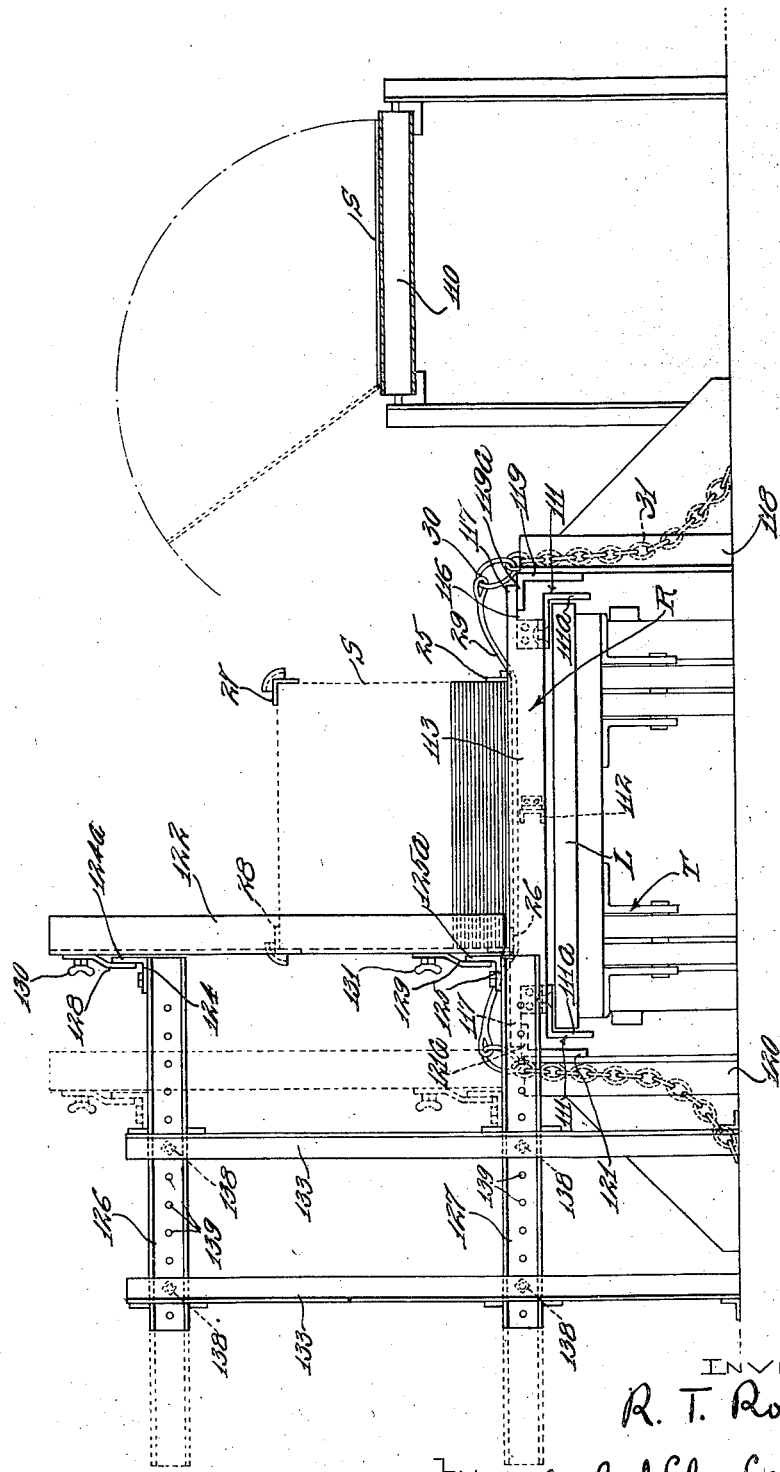

R. T. ROMINE 1,615,812

APPARATUS FOR HANDLING METAL

Filed March 11, 1926   8 Sheets-Sheet 4

INVENTOR:
R. T. Romine
by Macleod, Calver, Copeland & Dike
Attys.

Jan. 25, 1927.

R. T. ROMINE 1,615,812

APPARATUS FOR HANDLING METAL

Filed March 11, 1926    8 Sheets-Sheet 5

INVENTOR:
R. T. Romine
by Macleod, Calver, Copeland & Dike
Attys

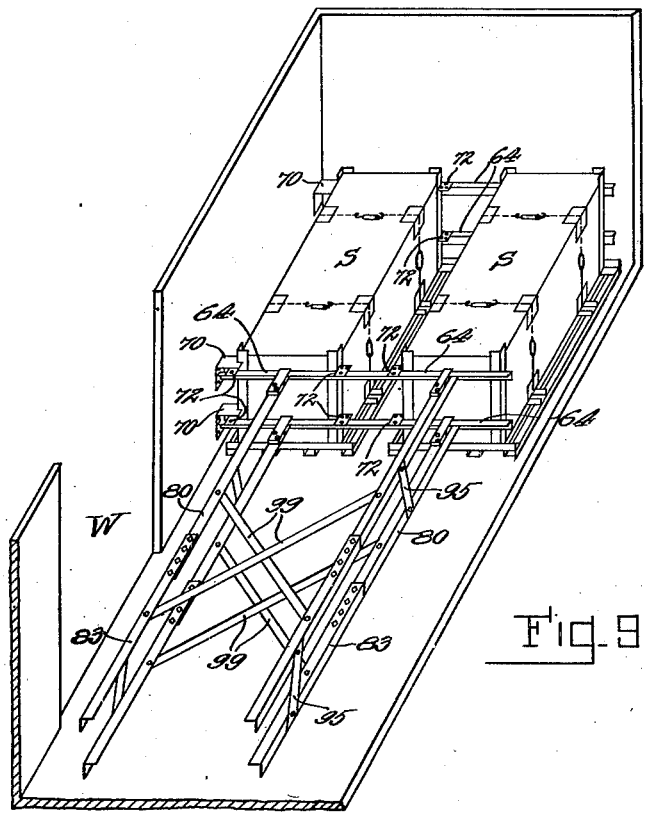
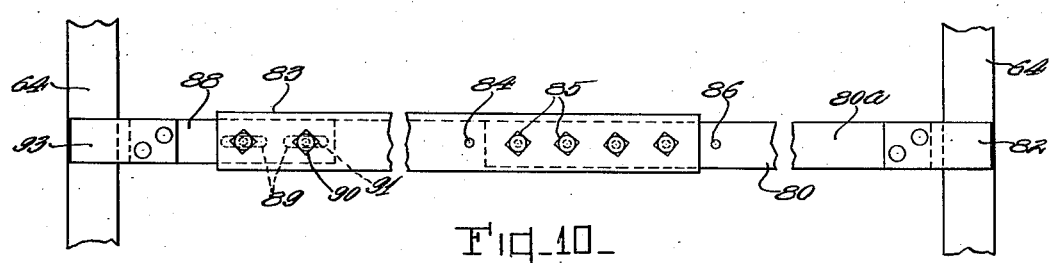
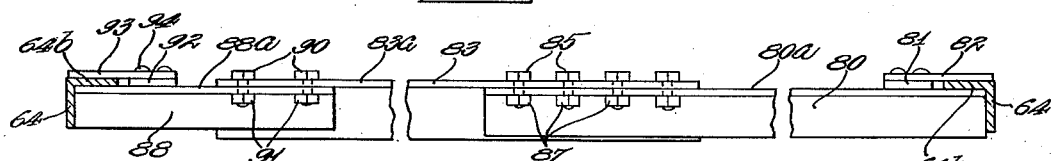

Jan. 25, 1927.
R. T. ROMINE
1,615,812
APPARATUS FOR HANDLING METAL
Filed March 11, 1926    8 Sheets-Sheet 7
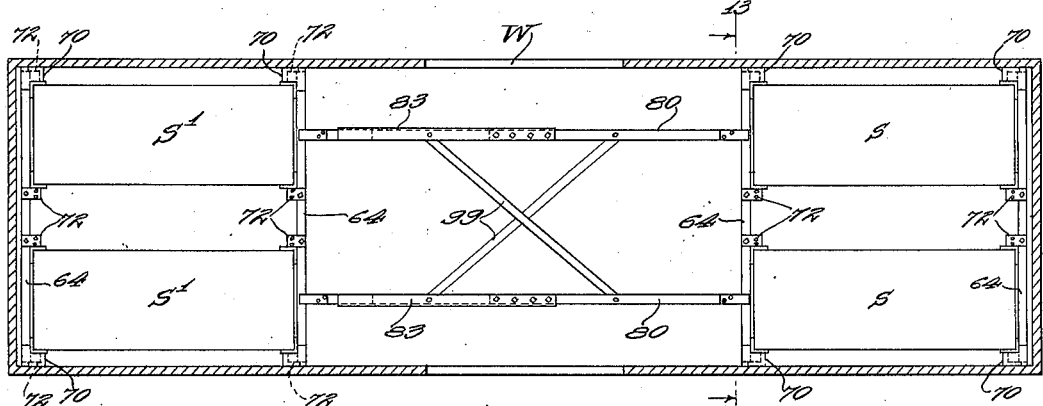
Fig. 12
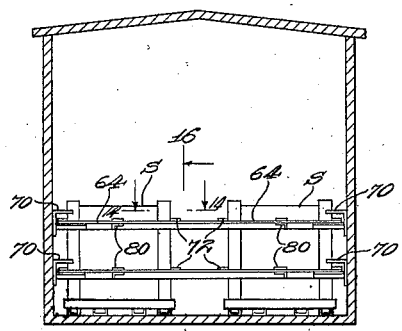
Fig. 13
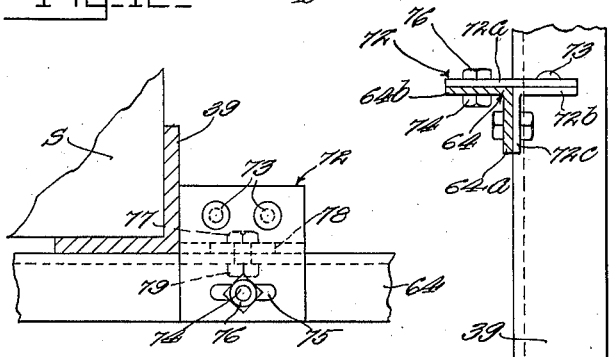
Fig. 14
Fig. 16
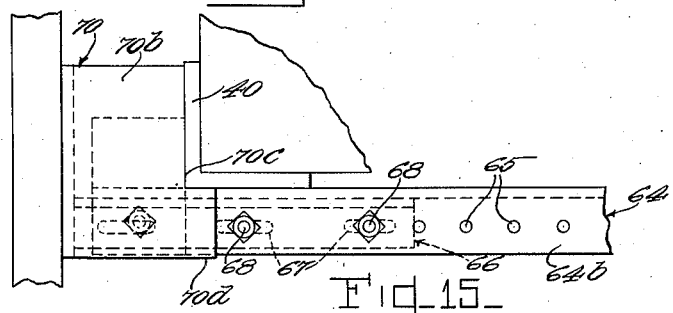
Fig. 15
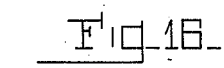
Fig. 18
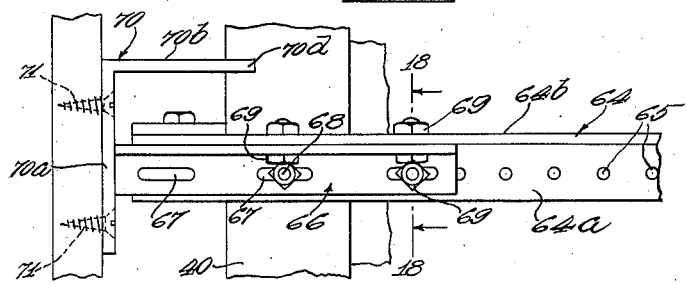
Fig. 17
INVENTOR
R. T. Romine
by Macleod, Calver, Copeland & Dike
Attys.

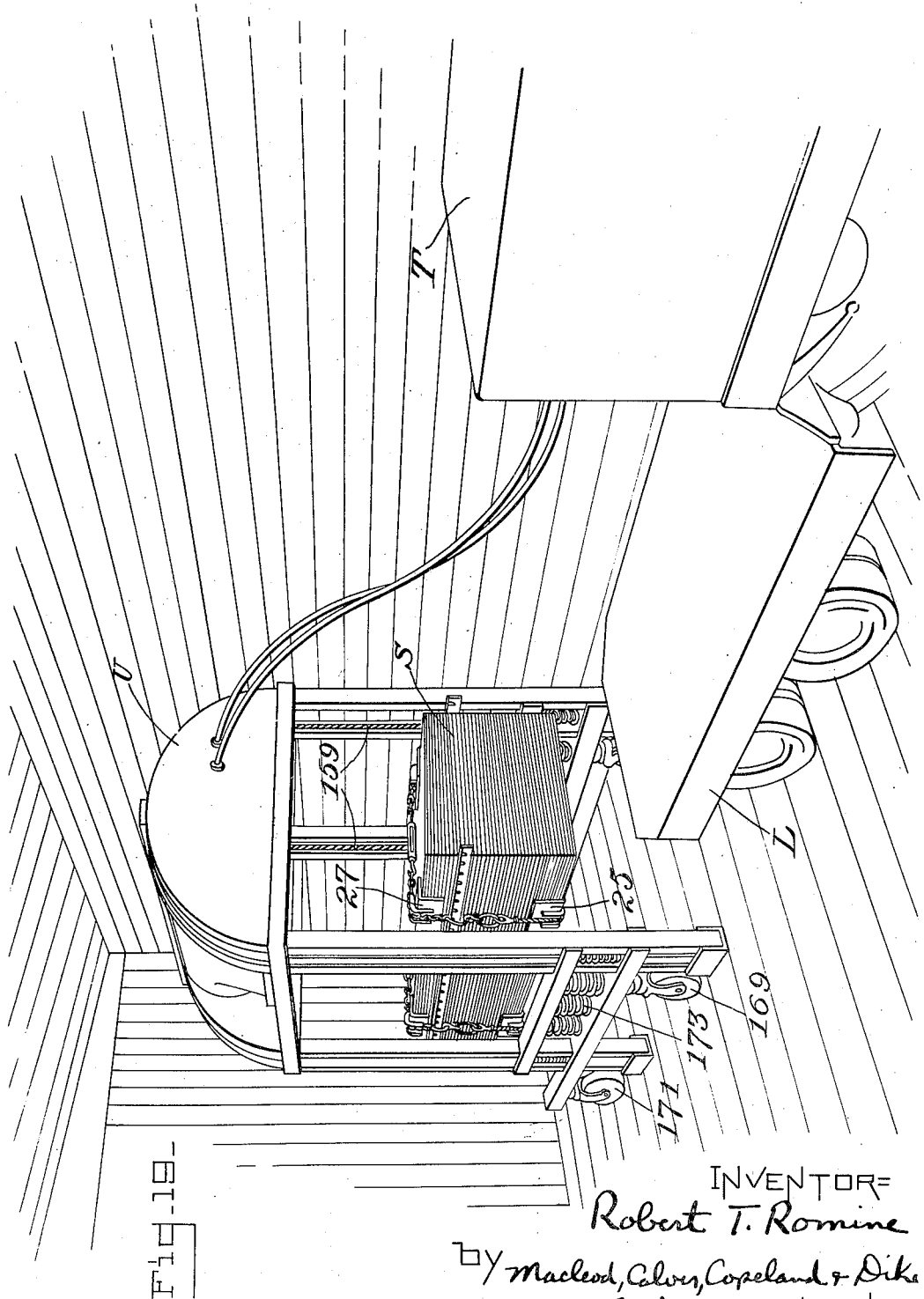

Patented Jan. 25, 1927.

1,615,812

UNITED STATES PATENT OFFICE.

ROBERT T. ROMINE, OF DETROIT, MICHIGAN.

APPARATUS FOR HANDLING METAL.

Application filed March 11, 1926. Serial No. 93,871.

This invention relates to the loading, transporting and handling of material in bulky or heavy loads or units without necessitating the breaking-up of the units or bundles and the separate manual handling thereof. In the present instance, one of the adaptations or applications of the invention is shown in connection with the handling of metal, such as sheet steel, although the invention may be practised in connection with various kinds of material, such as strip and bar metal, where handling and transportation of large, bulky or heavy units is required.

An object of the invention is to provide an apparatus whereby material, such as sheet steel, may be easily and rapidly loaded and delivered in bundles to a car, in which the sheets or individual pieces forming the bundle may be securely and rigidly packed and held together, and wherein the bundles or piles may be securely packed and held in the car against displacement during transit, and may be readily and quickly unloaded at the destination.

A further object is to provide an apparatus for handling metal such as sheet steel in which the metal is packed or braced on the car floor in such manner as to cause the packs to arrive at their destination in proper positions for enabling them to be bodily lifted and carried from the car.

Figure 3:
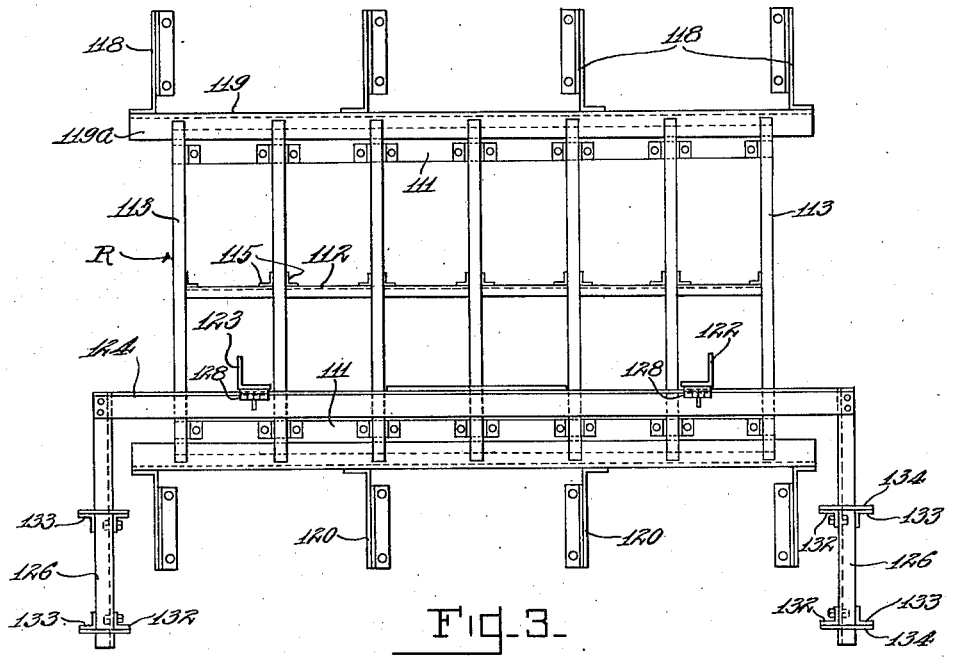
Figure 2:
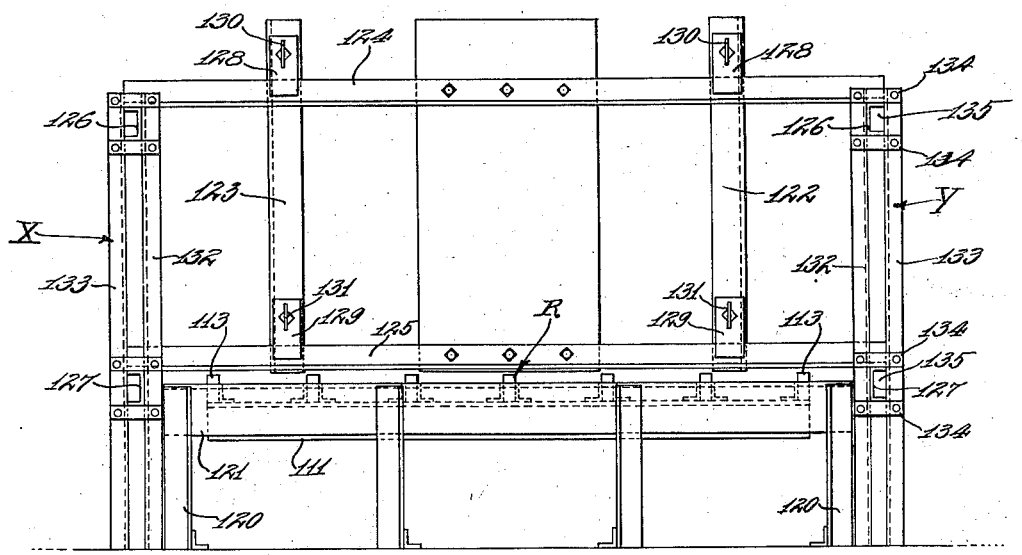
Figures 5, 6:
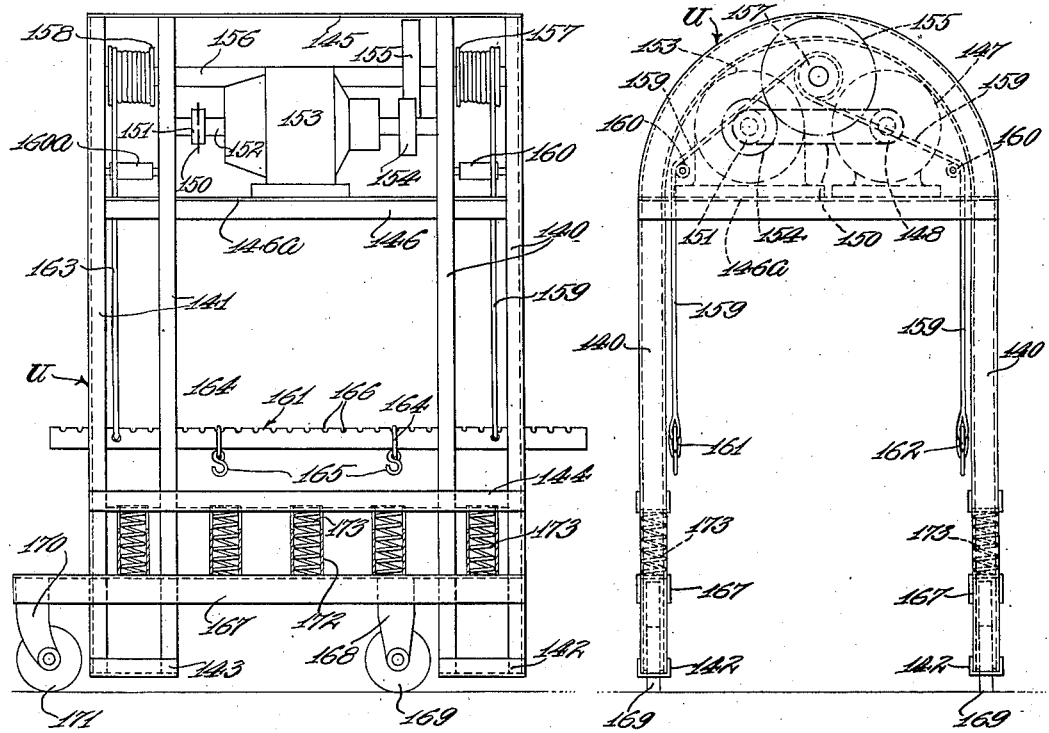
Figure 7:
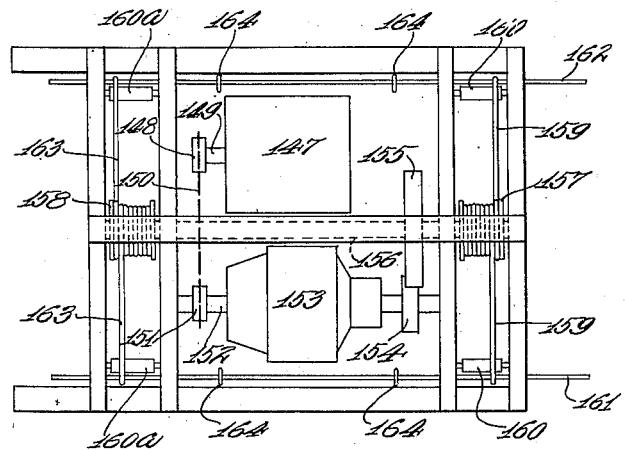
Figure 8A:
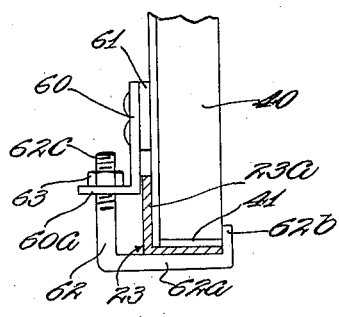
Figure 8:
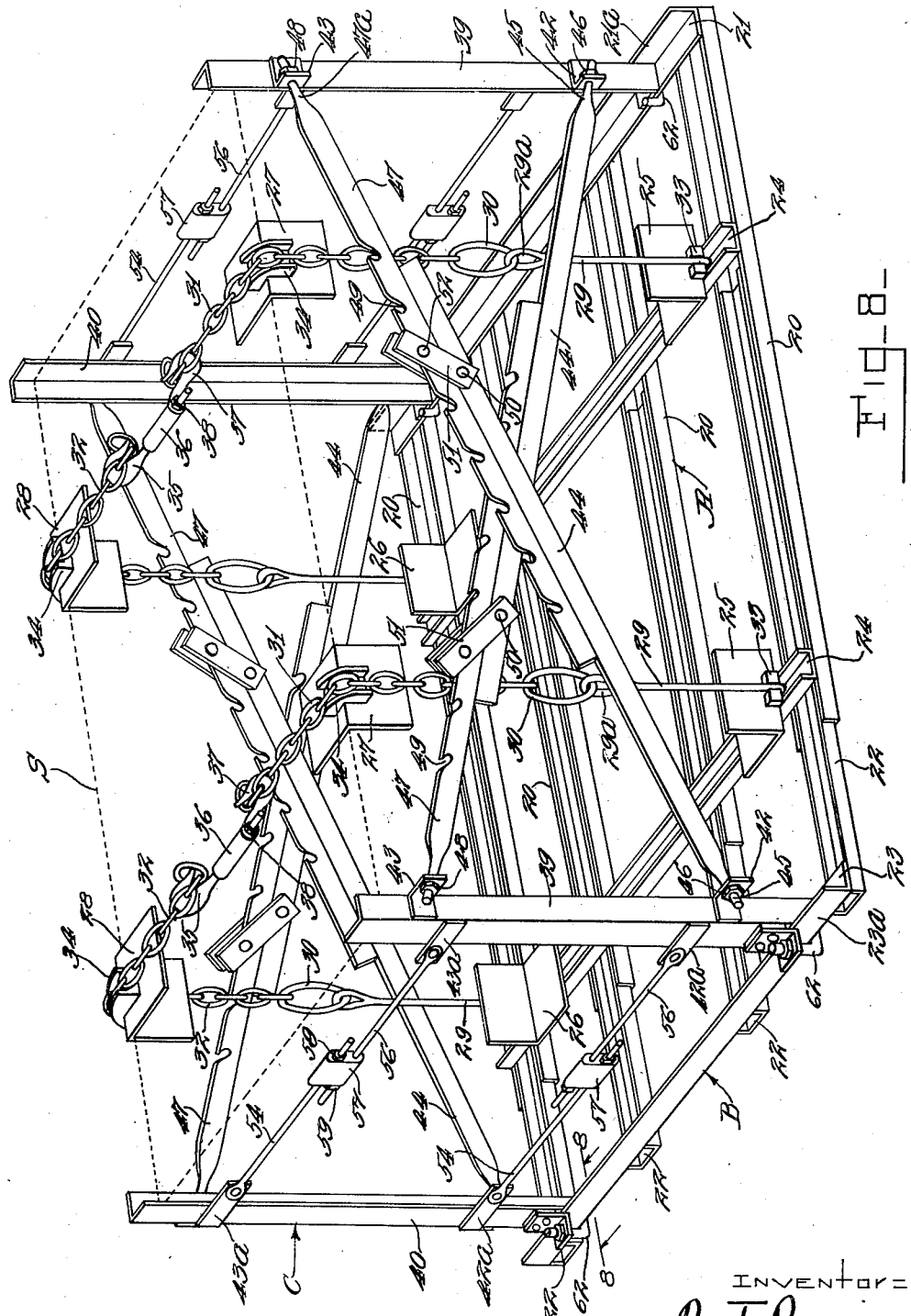

Other objects of this invention will appear in the following description and claims, reference being had to the accompanying drawings forming a part of this specification, wherein Figure 1 is an end elevation illustrating the manner of delivering and loading the sheet metal; Figure 2 is a front elevation of the delivery apparatus; Figure 3 is a plan view thereof; Figure 4 is a side elevation illustrating the method of handling loads in the car; Figure 5 is a side elevation showing the elevating rack or stack lifter; Figure 6 is an end view of the construction shown in Figure 5; Figure 7 is a plan view thereof; Figure 8 is a perspective view showing the car loading rack apparatus; Figure 8ᵃ is a fragmentary section taken on lines 8—8 of Figure 8; Figure 9 is a fragmentary perspective view illustrating the manner of loading the bundles in the car; Figure 10 is a fragmentary plan view showing a longitudinal brace; Figure 11 is a side elevation of the construction shown in Figure 10; Figure 12 is a plan view showing the freight car loaded in accordance with my invention; Figure 13 is a sectional view taken on lines 13—13 of Figure 12 in the direction of the arrows; Figure 14 is a detail plan view taken on lines 14—14 of Figure 13; Figure 15 is a fragmentary plan view showing the bracing for the corner of the bundle; Figure 16 is a sectional elevation taken on lines 16—16 of Figure 13; Figure 17 is a fragmentary elevation showing the construction of Figure 15; and Figure 18 is a detail section taken on lines 18—18 of Figure 17; and Figure 19 is a perspective view illustrating a stack lifter lifting a pack of sheet metal in position to be deposited on a lift truck platform.

Before explaining in detail the present invention, I desire to have it understood that the invention is not limited to the details of construction and arrangement of parts which are illustrated in the accompanying drawings, since the invention is capable of other embodiments and adaptations, and that the phraseology which I employ is for the purpose of description and not of limitation.

Heretofore great difficulty and expense has been involved in the handling of bulky or heavy stock, such as sheet steel, and in shipping the material. In the case of sheet steel, such as used for the building of automobile bodies, it has been necessary to oil the metal sheets to permit ready handling as well as to protect them against scratching. In all loading and unloading operations it was heretofore necessary to handle each sheet separately. The metal was hauled by hand in relatively small units, and each sheet unloaded in the car by hand. The sheets were handled by sliding one sheet on another and despite the fact that the surfaces of the sheets were oiled, an appreciable proportion of the sheets were scratched, rendering them defective, and resulting in considerable loss. On account of the necessity of handling each sheet, considerable labor expense was involved in loading and unloading a car having for instance a load capacity of forty tons.

One of the most difficult problems encountered in the shipment of this material resided in the packing or loading of the sheets in the freight car. This was heretofore done by piling the sheets at opposite ends of the car between buttresses built up with planks and braced by beams nailed to the floor of the car. This method of loading sheet steel was extremely objectionable due to the damage done to the freight cars by the sliding of the oiled sheets during transit as a result of the jerky or uneven movement of the car, frequently the sheets shearing through the walls of the freight car.

It was impossible by this method to prevent relative sliding movement of the oiled sheets, and therefore many sheets were damaged, and much damage was done to the cars.

The present invention eliminates the handling of the sheets separately, thereby saving considerable labor expense, as well as enabling bulky or heavy material to be loaded, transported, and otherwise handled in bulk or bundles.

In the case of sheet steel for instance, the sheets may be delivered in bundles weighing approximately ten tons to the car, and after the car has reached its destination the bundles may be bodily removed without any individual handling of the sheets or constituent pieces making up the bundle. By handling metal sheets in heavy or bulky bundles and by packing the bundles, in accordance with my invention, it has been possible to eliminate the necessity of oiling the sheets, as well as eliminating the separate handling at any time of the individual sheets and eliminating the damage previously done to the freight cars. This has resulted in an enormous saving. Further advantages resulting therefrom reside in eliminating the expense of burning off the oil from the sheets and washing the sheets before enameling, and the reduction to a minimum of the number of scratched or defective sheets.

The apparatus consists broadly of (1) apparatus for loading the metal at the mill preparatory to delivering and packing the sheets in cars; (2) apparatus for loading the material upon the cars; (3) apparatus for packing the material in the car whereby it may be held against movement during shipment; and (4) apparatus for unloading the material at destination, which is the same mechanism employed in loading the material upon the cars.

The present application is directed to the broad combination of mechanical units employed in practicing the method described and claimed in my divisional application, Ser. No. 109,124, filed May 14, 1926, and in this case no claim is made to any one of these mechanical units per se, the novel features of the individual units being described and claimed in a number of copending applications hereinafter referred to in connection with the description of each unit.

The present invention can best be described by setting forth the complete operation of (a) the handling and loading of the metal at the mill; (b) the loading of the material upon the cars; (c) the binding and bracing of the material in the car for transit; and (d) the unloading at destination.

(a) *Handling and loading at the mill.*— Referring to Figures 1 to 3 inclusive, I have illustrated the method of handling and loading the metal, such as sheet steel, at the mill preparatory to delivering and packing the sheets in cars for shipment. The metal sheets are carried on a suitable conveyor 110 to the point of delivery, at which point is located at one side of the conveyor a delivery apparatus, including a removable platform or pallet R, for supporting the pile or stack of sheets, or other metal, and in position to be picked up and bodily hauled by a load elevating truck preferably of ten ton capacity.

The pallet or platform R comprises in the present instance a pair of lengthwise extending angle bars 111, the vertical flanges 111$^a$ of which form spaced guides for guiding the truck T beneath the pallet. A series of spaced cross bars 113 are mounted edgewise upon and secured to the side angle bars 111, and are held in position by channel spacer members 112 secured to the cross bars by angles 115. The upper edges of the cross bars 113 extend above the upper edges of the channels, as clearly shown in Figure 1.

Each cross bar 113 at each end thereof is notched or cut away at 116, thereby providing projecting portions 117 which may be supported upon the horizontal flanges 119$^a$ and 121$^a$ of lengthwise extending angle bars 119 and 121. These angle bars are spaced apart the required distance and supported by suitable legs or supporting brackets 118 and 120.

The sheets S when deposited on the platform or pallet R are guided and positioned in superimposed relation by means of a pair of adjustably spaced vertical guides 122 and 123. These guides are slidingly supported to permit them to be shifted into and out of position over the pallet R. At the upper and lower ends of the guides are located lengthwise extending angle bars 124 and 125 respectively. The upper angle bar 124 is secured at each end to a slide bar 126, and the lower angle bar 125 in like manner is secured at each end to a corresponding slide bar 127. Each guide 122 and 123 at its upper end carries a projecting clamp 128 adapted to fit over the vertical flange 124$^a$ of the upper angle bar 124. In like manner, each guide 122 and 123 at its lower end carries a similar clamp 129 fitting over the flange 125ª. The guide bars 122 and 123 may be adjusted along the supporting bars 124 and 125 to the required positions, and are releasably secured in adjusted positions to the bars 124 and 125 by turning the wing nuts 130 and 131 to tighten the clamps 128 and 129 against the bars.

The slide bars 126 and 127 which carry the guides are mounted in side frames X and Y, comprising spaced pairs of vertical angle bars 132 and 133, the side frames being spaced apart a distance greater than the length of the platform R, as shown in Figure 2. Vertically spaced plates 134 are secured to the posts 132 and 133 thereby forming guideways 135 for the upper and lower slide bars 126 and 127. These bars may be adjusted in position with respect to the pallet R and held in adjusted position by means of bolts 138 which may be secured in any one of the holes 139 in the bars 126 and 127.

From the foregoing it will be seen that by adjusting the position of the slide bars 126 and 127, the guides 122 and 123 may be properly positioned over the pallet R in accordance with the width of the sheet, enabling the sheets when deposited against the guides to be centred on the pallet. By adjusting the guides toward or from each other, the forwardly extending flanges thereof may be spaced apart sufficiently to permit the sheets to fit therebetween. These guides therefore position the edges of the sheets, thus enabling the piling or stacking of the sheets in uniform relation. In use the pallet or platform R is placed in position on the angle bars 119 and 121 as shown in Figure 1. The tying cables are laid across the pallet in the recesses or guideways between the cross bars 113. The sheets are removed from the conveyor by turning them on edge and placing them one upon another on the pallet R without sliding the sheets. When a suitable number of sheets have been stacked the angle plates 25, 26, 27 and 28 (see Figures 8 and 1) are placed at the corners of the stack, and the cables 29—31 tied around the stack, these cables being tightened as hereinafter described to clamp the angle plates on the corners of the stack. After the stack S has been formed, the platform L of the truck T is run into position beneath the pallet R. Thereupon the guides 122 and 123 are slid rearwardly to clear the pallet, as shown in dotted lines, and the truck platform elevated sufficiently to enable the pallet or platform R with its load to be carried from its supports and thence to the freight car. The mechanism thus far described is not claimed in the present application, but constitutes the subject matter of my application Ser. No. 104,378, filed April 24, 1924, and entitled "Portable loading platform." It will be seen that by notching the cross members of the platform at 116 the truck platform having substantially as great width as the pallet R may be elevated beneath the angle portions 119ª and 121ª sufficiently to enable the pallet to be cleared from its supports.

In the foregoing description I have illustrated in accordance with my invention the method of loading the metal in piles, stacks or bundles, from the conveyor which delivers the material at the mill. For the purpose of illustrating the invention, the metal is shown in the form of metal sheets or sheet steel, but the invention is not limited to the particular type of stock which may be handled in accordance with this invention.

(b) *Apparatus for loading material upon the cars.*—As above described, a stack or pile, comprising a predetermined number of sheets or pieces, all of a predetermined weight, such as ten tons, is tied together in a bundle on the pallet R, and thereafter the truck platform L is elevated to pick up the pallet and bundle from the supports 118 and 120. The truck may then be run or propelled with its load directly into the freight car through the doorway W of the car (see Figure 9). When the load S on the pallet R is thus brought into the car it is then removed from the pallet and deposited in position to be secured in the car for shipment. This is accomplished as hereinafter described by means of my improved rack apparatus, shown in Figures 8 to 18 inclusive. Before describing the rack apparatus in detail, it should be explained that the same is not claimed in this application per se, but it constitutes the subject matter of a separate application, Serial No. 104,910, filed April 27, 1926, and entitled "Lifting rack". This rack is an important unit of the general combination of units constituting the complete apparatus for loading and unloading cars. Its generic features which make it a particularly important element of the general combination constituting the complete loading mechanism are (1) it is of a type permitting ready introduction into a car and removal therefrom; (2) it is adapted to rest upon the car floor at a plurality of points disposed on opposite sides of a plane extending through the center of a pack or bundle of material, or, more specifically, is adapted to be arranged in the same plane of the car with the pack and in the immediate vicinity of the pack; (3) preferably, it should have a plurality of supporting elements resting upon the floor on opposite sides of the pack, and in substantially the same transverse plane of the car with the pack. Such a construction insures a stable support for the mechanism, which must raise and lower the relatively heavy units weighing as high as ten tons, provides a desired distribution of weight over the car floor and balances the pack properly during the raising and lowering operations. These more generic characteristics of the lifting mechanism will be more fully understood in connection with the following description of a preferred form illustrated in the drawings.

Referring to Figures 4 to 7 inclusive, an elevating rack or stack lifter is shown for bodily removing the bundle or stack S from the pallet or platform R, to permit the truck T with the pallet remaining thereon to be run out from beneath the bundle, and thereafter depositing it on the floor of the car. The stack lifter or elevating rack U is constructed of a height to permit it to be propelled through the door into the car and also to straddle the load and the rack which is used to pack the bundle in the car. The rack U is at the same time constructed to lift bodily bundles or units of metal preferably of at least ten tons in weight. The framework of the rack or stack lifter comprises in the present instance two parallel pairs of U-shaped angle bars 140 and 141. In the present instance, each of these angle bars is bent into U-shape, thereby providing spaced side frames or supports securely connected together at the tops thereof. Each of the members 140 and 141 extends downwardly into position to form leg supports, and the adjacent pairs are connected together by channels 142 and 143 forming supporting feet for the rack. The frames 140 and 141 are rigidly secured together by means of bars 144, 145 and 146, thereby providing a rigid and strong frame structure. Carried by the side bars 146 is a suitable platform 146ª at the upper portion of the framework, and mounted on this platform is an electric motor 147, driven from any suitable source of power. A sprocket 148 is mounted on the armature shaft 149 of the motor and this sprocket is connected by means of a chain 150 to a sprocket 151 on the shaft 152 of a spur gear reducer 153. Thence the power is transmitted to the driven shaft 156 by means of meshing spur gears 154 and 155.

At the opposite ends of the driven shaft 156 are mounted drums 157 and 158. A pair of lifting cables 159 are adapted to be wound and unwound on the drum 157, these cables, as shown in Figure 6, extending in opposite directions over idlers 160, and thence extending vertically at opposite sides of the frame. Each cable 159 at its lower end is connected to one end of lengthwise extending lifting bars 161 and 162. In like manner the drum 158 is adapted to wind and unwind lifting cables 163 extending over idlers 160ª, and connected at the lower ends thereof to the opposite ends of the lifting bars 161 and 162.

Loosely mounted on each bar 161 and 162 are a pair of adjustable links 164 carrying hooks 165. These links may be adjusted into various positions along the bars 161 and 162 in the notches 166, thereby permitting the hooks 165 to be properly spaced in order to hook into the bundle to be lifted. As shown in Figures 4 and 19, the bundle S may be run into position on the truck platform L between the side frames 140 of the rack U, and beneath platform 146ª. Thereupon the hooks 165 are hooked into the links or eyes 30 of the tying elements for the bundle, and upon operating the switch of the motor 147 the bundle S may be lifted sufficiently to clear the pallet R. Thereupon the truck T with the pallet thereon is run out from beneath the rack U, into the position shown in full lines in Figure 4 and in the position shown in Figure 19. By reversing the motor 147 the bundle S, shown in dotted lines in Figure 4, may be lowered in position upon the floor of the car, or as hereinafter described, upon the pallet section A of the rack C, shown particularly in Figure 8. After the bundle has been deposited on the floor of the car, the rack or stack lifter U may be wheeled away from the stack.

Referring to Figure 5, the rack or crane U is provided with supporting wheels 169 carried by brackets 168 secured to a slide bar 167. This bar is in the form of a channel which is slotted to freely embrace the posts or bars 140 and 141. At the forward end of the truck steering wheels 171 are mounted on swivel arms 170 supported by the spaced slide bars 167. On their upper faces each bar 167 is provided with vertically extending tubular plungers 172, which slide freely through holes in the fixed bar 144 of the frame. Between the bars 167 and 144 are located compression springs 173. These springs are of sufficient strength to support the truck U upon the wheels 169 and 171 without the load. When a load of predetermined weight is suspended from the bars 161 and 162 the springs 173 will be compressed, raising the bars 167 and causing the rack to be supported on the feet 142 and 143, thereby taking the weight of the truck and load off the wheels and providing a greater bearing surface by virtue of the feet 142 and 143. As soon as the load has been released in the car, the truck will be automatically supported by its wheels and may then be readily propelled out of position over the bundle. It will be understood that because the feet or supporting elements of the rack rest upon the floor at opposite sides of a plane extending vertically through a pack, both the mechanism and pack are suitably balanced during the lowering of the pack, and this is particularly important also in the unloading operation during which the rack is used, as will be hereinafter described.

An important feature of this rack is, also, its general construction which enables it to span the pack and it is preferred, as set forth in the claims, that this spanning shall be over or above the pack, so as to constitute a straddling thereof. Such a construction which is adapted to span the pack enables the location of the working mechanism for raising and lowering the pack directly above or below the pack, depending upon whether the part crossing the pack is above or below it. This arrangement causes the lifting power to be very directly applied to the pack and to lift it evenly. Moreover, the weight is thus evenly distributed to the supports of the rack to the floor which, in the specific form illustrated and described, are arranged at opposite sides of the pack, although it will be understood that the broad idea involved is their arrangement at points on opposite sides of a center (either transverse or longitudinal) plane of the pack. Thus the points of support of the pack upon the car floor are disposed within the points of support of the lift mechanism, although the reverse arrangement would also provide a satisfactory construction.

These general advantages and characteristics of the rack are important in connection with the loading of the material upon the car, and particularly in connection with its unloading, which operation will be later described, for the reason that this unloading operation has heretofore required a great deal of labor and time, all of which is saved by the use of this mechanism.

Each load which may approximate ten tons, is thus delivered to the car in bundles, each bundle usually comprising a pile of sheets of uniform size, which is carried or hauled bodily into the box car by means of the industrial truck T. This truck is preferably constructed as shown and described in my copending application, Serial No. 118,584, filed June 25, 1926. In the case of a car of forty ton capacity, I prefer to deliver the material to the car in four units of ten tons each. Four such bundles are preferably placed in the car, two at each end thereof, in the positions illustrated at S and S' in Figures 9 and 12. Each bundle or pile of sheets is secured together in a unit in such manner as to prevent relative movement of the individual metal sheets in the bundle. In addition the four separate units or bundles may be rigidly braced apart and from the side walls of the car, preventing relative movement of the bundles during transportation. The entire rack construction or apparatus by which the sheets are tied together in units and secured within the car is adapted to be readily assembled and collapsed to an extent sufficient to permit delivery and removal of the bundles, and in addition is adjustable to accommodate material of varying width and length.

(c) *The bracing or packing mechanism.*—Referring to Figures 4, 8, and 19, with the bundle suspended from the lifting mechanism of the rack U, and after the truck platform L has been propelled rearwardly from beneath the bundle, the pallet section A (Figure 8) may be slid into position beneath the bundle. The sections A and B are then telescoped as shown in Figure 8, and the bundle is lowered upon the cross channels 24 of the pallet. The lifting rack U is then wheeled away from the bundle.

The pallet section A in the present instance is shown as comprising a series of four longitudinal channels 20, and welded across one end thereof is an angle bar 21. The pallet section B also comprises a series of spaced channels 22 of smaller size so as to slidingly fit within the channel members 20. Welded to the ends of the several channels 22 is an angle bar 23. Extending transversely to the pallet and welded to the tops of the channel members 20 are a pair of spaced channels 24.

The stack of sheets when delivered to the car is held together by means of adjustable flexible elements encircling the stack or pile. At the longitudinal corners of the stack are placed spaced angle members or plates 25, 26, 27 and 28, as clearly shown in Figure 8. The plates of each set of four are located in transverse alignment, and the bottom plates 25 and 26 are adapted to rest upon the transverse channel members 24. Each set of angle plates is securely clamped or tied against the bundle by a flexible element including a flexible cable 29 extending through grooved guides 33 on the outer sides of the plates 25 and 26, the cable 29 passing around and underneath the plates 25 and 26 and through the channel member 24. Each flexible cable 29 terminates in a loop 29ª, to each of which is connected a large link or eye 30, and to each link 30 is connected a flexible chain 31 or 32. The angle plates 27 and 28 are provided with quarter pulleys 34 forming grooved guides for the chains 31 and 32. Chains 31 and 32 are adapted to be drawn together by means of a turnbuckle, thereby drawing the several angle plates, 25, 26, 27 and 28 tightly toward each other. In the present instance, a grab hook 35 may be connected to one of the links of chain 32, this hook having a threaded shank extending through the body portion 36 of a grab hook 37, the latter being connected to a link of chain 31. The threaded shank of hook 35 at its free end is provided with an adjusting nut 38 which may be operated by means of a speed wrench thereby drawing together or loosening the chains 31 and 32.

The bundle or pile of sheets is securely clamped together at the upright end corners thereof also by means of angle members and flexible tying elements, the angle members forming posts or buttresses, and designated at 39 and 40. To the bottom of each post 39 and 40 is welded a flat square plate 41. To the post 39 are welded at the bottom and top thereof respectively a pair of brackets 42 and 43. A pair of flexible diagonal straps 44 extend between each diagonally opposed pair of brackets 42 and 43, and each strap 44 terminates in a threaded portion 45 extending through a hole in one of the brackets 42 and is adjusted by means of a nut 46. A pair of diagonal flexible straps 47 co-operate with the straps 44, each terminating in a threaded end $47^a$ extending through a hole in one of the brackets 43, and adjusted by means of a nut 48. The straps 47 are provided with inclined notches 49 along the upper edges thereof. A swinging clamp 51 is pivoted at 50 to each of the straps 44, these clamps comprising parallel side members embracing opposite sides of the adjacent members 44 and 47, and connected together by means of a cross pin 52 which may be adjusted in any one of the notches 49.

It will be seen that when the angle members 39 and 40 are placed in position at the upright corners of the bundle an approximate adjustment of the members may be obtained by means of clamps 51 adjustably connecting together the pairs of cooperating straps 44 and 47. A fine adjustment is obtained by applying a speed wrench to the nuts 46 and 48.

Adjacent to the angle brackets 42 and 43 and secured to the posts 39 and 40 are plates $42^a$ and $43^a$. The lower and upper pair of plates $42^a$ and $43^a$ respectively form attaching means for adjusting devices adapted to draw the posts 39 and 40 together transversely of the bundle. Each adjusting device is identical and comprises a threaded rod 54 pivoted to one of the plates $42^a$, $43^a$ and an oppositely extending threaded rod 56 pivoted to the opposite plates $42^a$, $43^a$. These rods extend in opposite directions through tapped holes in a body member or sleeve 57, and at the free ends of the rods, at opposite sides of the member 57, are located nuts 58 and 59. By applying a speed wrench to either or both of these nuts the rods 54 and 56 may be drawn together endwise thereby drawing posts 39 and 40 in transverse directions against the bundle.

Riveted to each of the posts 39 and 40 is an angle 60 which is spaced from the face of the post 39 or 40 by a suitable spacer 61 providing sufficient clearance to fit over the vertical flange $23^a$ or $21^a$ of angle bars 23 and 21. As shown in Figure $8^a$, angle bracket 60 has an outwardly extending flange $60^a$ drilled to receive the threaded end $62^c$ of an angle bolt 62. This bolt is bent at right angles at $62^a$ so as to extend underneath the angle bar 23 or 21, the free end of the bolt being offset to provide a portion $62^b$ adapted to confine the inner edges of angle bar 23 or 21 and plate 41. Thus by tightening the nut 63 on bolt 62 the lower end of each post 39 or 40 will be clamped to angle bar 23 or 21.

As illustrated in Figures 2 and 5 the stock is preferably delivered in position within the box car in stacks or piles. The bundles or stacks when hauled on an industrial truck of the load elevating type through the doorway W of the car are held by means of the flexible elements 29—31, which transversely bind the sheets or pieces of the bundles together. By means of the rack construction above described, the sheets or parts of each stack or bundle are rigidly clamped together so as to prevent any substantial relative movement of the individual sheets during transit. In addition, means is provided whereby the several bundles or stacks may be braced apart one from the other and maintained in such positions with relation to the car walls as to provide and retain predetermined longitudinal aisle spaces in transit.

Extending transversely across each end of the adjacent stacks S and also across each end of the adjacent stacks S' are a pair of vertically spaced transverse braces 64. One brace 64, as shown in Figure 9, is located adjacent to the top of the bundles and the other extends parallel thereto, and is located adjacent to the bottoms of the bundles. In the present instance, eight of these braces 64 are provided, each being identical. Each brace 64 comprises an angle bar abutting against the vertical posts 39 and 40. This bar is provided with spaced holes 65 in the horizontal flange $64^b$ thereof and in the vertical flange $64^a$. At each end of the bar 64 is adjustably located an angle bar 66 which is telescoped therewith. The horizontal and vertical flanges of the bar or extension 66 are provided with slots 67 for the reception of bolts 68 carrying nuts 69. At the outer end of each angle extension 66 is welded an angle plate 70. The vertical flange $70^a$ of this plate is provided with holes for the reception of screws 71 by means of which the entire cross brace may be supported by the opposite side walls of the car. The horizontal flange $70^b$ of angle plate 70 is notched at $70^c$ so as to abut against the post 39 or 40 (see Figure 8), and to provide a lug or projection $70^d$ adapted to overlap the front side of the post 39 or 40.

Carried by each of the transverse braces or angle bars 64 are a pair of spaced adjustable clamps 72 (see Figures 14 and 16) Each clamp 72 comprises a horizontal plate $72^a$ and an angle plate having a horizontal flange 72$^b$ riveted at 73 to the plate 72$^a$, and also comprising a vertical flange 72$^c$. The latter is adjustably connected to the vertical portion 64$^a$ of bar 64 by a bolt 77 extending through a slot 78 and adjusted in position by means of a nut 79. The horizontal portion 72$^n$ of clamp 72 is in like manner adjusted on the horizontal flange 64$^b$ by means of a bolt 74 extending through a slot 75 in flange 72$^a$ and adjusted by means of a nut 76.

From the foregoing it will be seen that the clamps 72 are slidable on the transverse braces 64, and each pair of clamps may be rigidly secured in position so as to embrace and clamp therebetween a pair of posts 39 and 40.

As illustrated the bundles or stacks S at one end of the car may be braced from the bundles or stacks S' at the opposite end of the car by means of longitudinal extensible brace members. A pair of these brace members one above the other extend between the opposite stacks S and S'. Each of these longitudinal braces is identical in construction and comprises a pair of angle bars 80 and 83 (see Figures 10 and 11) telescoped one with the other. The bar 80 at one end is provided with a clamp plate 82 spaced from the horizontal flange 80$^a$ by means of a suitable spacer 81, thereby forming a clearance adapted to receive a horizontal flange 64$^b$ of the cross brace 64. The angle bar 83 is provided with spaced holes 84 in its horizontal flange 83$^a$ for the reception of bolts 85 which may pass through any of the holes 86 in the horizontal flange 80$^a$ of bar 80. These bolts may be tightened by means of nuts 87. At the end of the bar 83 is telescopically connected an adjustable extension member 88, the horizontal flange 88$^a$ of which is provided with slots 89, and by means of bolts 90 provided with nuts 91 the extension 88 may be adjusted into the proper position to cause the brace to fit tightly between the stacks S and S'. The upper flange of the extension 88 is provided with a clamping plate 93 spaced from the bar by means of a suitable spacer 92 and riveted at 94. As in the case of the clamping plate 82 at the end of angle bar 80, the clamping plate 93 is adapted to fit over the flange of one of the cross braces 64. It will be seen that by means of the holes 84 and bolts 85 the bars 80 and 83 may be adjusted endwise into the approximately correct position. Thereafter a fine adjustment may be made by adjusting the extension 88 to the correct position relative to bar 83.

The longitudinal braces may be braced apart vertically by means of inclined bars 95. Each of these bars or braces may be adjustably secured in the proper position by means of slots and bolts in the manner above described. The longitudinal braces may also be braced apart transversely by means of diagonal cross braces 99 which may also be adjustably secured in the proper positions by means of bolts and slots.

The present rack apparatus is adapted for clamping together a plurality of bundles or stacks of sheets. In such case, a plurality such as four separate stacks, may be placed together and separated by means of transverse and longitudinal separators or spacer plates. Thus the apparatus may be readily utilized for tying together within the car a plurality of stacks or bundles, and preventing any relative sliding movement of the metal sheets during transit.

(d) *The unloading mechanism.*—It will also be seen from the foregoing that the bundles or stacks, after the car has reached its destination, may be readily freed to permit removal thereof. It is merely necessary to loosen the bolts 90 and thereby permitting the removal of the pairs of longitudinal braces or bars 80 and 83. Thereafter the screws 71 in angle brackets 70 are removed, and nuts 69 removed, thereby permitting the removal of the brace extension 66. By loosening the clamps 92 the bars 64 between the four stacks may be removed. Thereupon the posts 39 may be removed from the forward corners of the bundles. The lifting rack U (see Figure 4) is wheeled into position to straddle the bundle and pallet sections A and B. Hooks 165 on the lifting bars of the elevating rack are connected to the four eye links 30 of the tying elements of the bundle. Thereupon the bundle is lifted and pallet section A is slid out from beneath the bundle. The use of this lifting rack to raise the pack above its position on the floor, or as is stated in the claims, above its horizontal plane of transit, constitutes the initial conveying movement of each pack during the unloading operation, and, consequently, the lift device may be considered a primary conveyor. Its most valuable characteristics are those which have been set forth in detail in connection with the description accompanying the explanation of the loading of the material upon the car. As will be understood, it is important that its points of support be relatively arranged so that they are disposed on opposite sides of a plane extending through substantially the center of the pack, whereby both the pack and mechanism are evenly supported or balanced during the lifting operation although in the specific form of device illustrated and described, the points of support are entirely outside the pack, and on opposite sides thereof; moreover, they are arranged in the same transverse plane of the car with the pack which is important in order to obtain a supporting of the lift device in the immediate vicinity of the pack as distinguished from supporting it at a single point remote from the pack which would be necessary were a mechanism such as a portable crane having a forwardly projecting boom, employed. The broad feature of this lift rack is its plural point of support on the floor, the points of support being disposed not at one side of the pack, but on opposite sides of a plane extending through its center.

The lifting of the bundle or pack by the lift device enables the truck T, which is illustrated simply to make clear a suitable type of secondary conveying medium, to be propelled beneath the bundle and between the side frames of rack U, the wheels of the truck T traveling unimpeded between channels 22 of the rear pallet section B, which does not need to be removed from beneath the bundle. The load or bundle is then lowered by the elevating rack U upon truck platform L, or preferably upon a platform such as the pallet R provided with legs Q (see Figure 4). The truck is then propelled out of the freight car and the bundle S and platform R may be transported and delivered at any suitable delivery or storage place. In this manner a freight car of forty tons capacity, loaded with four ten ton bundles or stacks, may be quickly and automatically unloaded without breaking up the bundles and without any manual handling of the separate parts of the bundles or piles. Although the lifted bundle is transferred to a self-propelled truck, it will be understood, of course, that the present invention is not limited to the use of a truck as a secondary conveyor, since any means suitable for use to receive the lifted pack from the primary conveyor and adapted to effect its transportation through the car doorway, would come within the scope of the broad idea. One advantage of the truck, however, is that it may be moved to position beneath the lifted pack while it is maintained directly above its position of transit, and thus it is not necessary to move the lifted pack horizontally before it is transferred. It will be understood, however, that this one advantage of the truck device is only a preferred one, and that the use of a secondary conveyor not having this particular advantage would be within the scope of the invention.

It will be seen that the foregoing method greatly expedites and facilitates the loading and unloading of freight cars, thereby rapidly releasing the cars in the freight yards and increasing the amount of stock or freight which may be unloaded or loaded during a given period of time. In addition the present invention eliminates a large proportion of the labor expense heretofore required in loading and unloading bulky or heavy material. Where previously the maximum loads hauled or trucked in freight yards, warehouses, or storage places, approximated not over two or three tons, by virtue of the present invention loads ranging from five to ten or even fifteen tons may be transported to the freight cars, unloaded and thereafter removed from the cars without any separate manual handling of the loads or without breaking up the bundles or units, and without the separate manual handling thereof to load or unload.

In the present case I have illustrated the invention as applied to the loading, unloading and transporting of sheet steel in stacks. It will be seen that my method and improved apparatus enable the sheet steel after leaving the rolling mill to be handled in units, bundles or stacks preferably ranging from five to ten tons. In the case of sheet steel used in automobile body building, I handle the metal preferably in units of approximately ten tons, four of which may be loaded in a freight car of forty ton capacity. In this instance the metal is hauled in unitary stacks into and out of the car on a self propelled load elevating industrial truck of ten ton capacity. Other types of loads, especially in the case of less heavy and more bulky loads, may preferably be automatically handled by means of similar trucks of from five to ten ton capacity.

In the handling of sheet steel alone my invention enables vast savings not only to the steel mills, but to the railroads and the manufacturer as well, such as manufacturers of automobiles. Shipments are speeded up, congestion in freight yards is reduced, freight cars are quickly released for further use, freight cost reduced and damage to freight cars largely eliminated. In addition to the foregoing all the labor expense heretofore required in separately loading and unloading the sheets at different stages of transportation is done away with. The cost of oiling the sheets is saved. Losses due to scratching the sheets caused by workmen in sliding the sheets when loading and unloading are eliminated. The cost of removing the oil from the sheets and washing the sheets preparatory to enamelling is saved; and better and cheaper enamel jobs permitted where the sheets have not been previously oiled. As regards the handling of sheet steel, without reference to other materials, I believe I am the first to conceive and to accomplish the packing of the metal on the car floor in such manner as to enable the handling of the metal in relatively heavy stacks, such as ton or more units, and for most practical purposes ten ton units, so that a car of forty ton capacity may be quickly loaded by hauling thereinto four successive ten-ton loads and automatically depositing the same; also enabling such a car to be quickly unloaded by picking up and hauling out of the car four ten-ton loads. Thus where it heretofore took a number of workmen a number of hours to load forty tons of sheet steel in a car and after shipment to unload the same, I am able to accomplish this in a few minutes and with less workmen.

It is to be understood that by describing in detail herein any particular form, structure, or arrangement, it is not intended to limit the invention beyond the terms of the several claims or the requirements of the prior art. For instance, although the individual mechanical units (1) the truck; (2) the rack or stack lifter; and (3) the binding or bracing means, have been described in detail, the present invention is not limited to the use of these specific units, except in so far as they are defined in the claims, which refer to their individual characteristics or features of construction, only to the extent such features enter into the combination.

I claim as my invention:

1. In an apparatus for handling relatively heavy material bound together in packs, such as sheet metal, and in combination, a device for vertically raising and lowering a pack and maintaining it lifted above its horizontal plane of transit in a car, said device having spaced supporting elements adapted to rest on the floor of a car at opposite sides of a vertical plane extending through the center of a pack and a secondary conveying medium adapted to present a pack to said device or to receive a pack from said device to transport the same through a car doorway, said conveying medium being adapted to receive the pack while supported in spaced relation to the car floor by said lifting device.

2. In an apparatus for handling relatively heavy material bound together in packs, such as sheet metal, and in combination, a device for vertically raising a pack and maintaining it elevated above its horizontal plane of transit in a car, said device having spaced supporting elements adapted to rest on the floor of a car at opposite sides of a vertical plane extending through the center of a pack and longitudinally of the car and a secondary conveying medium adapted to present a pack to said device or to receive a pack from said device to transport the same through a car doorway, said conveying medium being adapted to receive the pack while supported in spaced relation to the car floor by said lifting device.

3. In an apparatus for unloading freight cars with relatively heavy material bound together in packs, such as sheet metal, and in combination a device for vertically raising the pack and maintaining it lifted above its plane of transit in a car, said device having spaced supporting elements adapted to rest on the floor of a car at spaced points at opposite sides of a vertical plane extending through the center of a pack, wheel means for supporting said device and a secondary conveying medium adapted to receive a lifted pack from said device and to effect transportation of the same through a car doorway.

4. In an apparatus for unloading freight cars, with relatively heavy material bound together in packs, such as sheet metal, and in combination, a device for vertically raising the pack and maintaining it lifted above its plane of transit in a car, said device having spaced supporting elements adapted to rest on the floor of a car in the same transverse plane of a car with the pack, and a secondary conveying medium adapted to receive a pack from said device to transport the same through a car doorway, said conveying medium being adapted to be arranged beneath the pack supported in spaced relation to the car floor by said lifting device.

5. In an apparatus for unloading freight cars with relatively heavy material bound together in packs, such as sheet metal, and in combination, a device for vertically raising a pack and maintaining it lifted above its plane of transit in a car, said device having spaced supporting elements adapted to rest on the floor of a car on opposite sides of a vertical plane extending through the center of a pack, and a secondary conveying medium adapted to receive a lifted pack from said device to transport the same through a car doorway.

6. In an apparatus for unloading freight cars with relatively heavy material bound together in packs such as sheet metal, and in combination, a device for vertically raising a pack and maintaining it lifted above its horizontal plane of transit in a car, said device having spaced supporting elements adapted to rest on the floor of a car at spaced points at opposite sides of a vertical plane extending through the center of a pack and in the same transverse plane of the car with the pack, and a secondary conveying medium adapted to receive a lifted pack from said device to transport the same through a car doorway.

7. In an apparatus for unloading freight cars with relatively heavy material arranged in packs, such as sheet metal, and in combination means for supporting a pack on the floor at spaced points, and with spaces provided at opposite sides of a vertical center plane extending through the pack, a device for vertically raising a pack and maintaining it lifted above its horizontal plane of transit, said device having spaced supporting elements adapted to rest on the car floor in spaces at opposite sides of a vertical center plane extending through the pack and outside said points of support of the pack, and a secondary conveying medium adapted to receive the lifted pack from said device to convey the same through the car doorway.

8. In an apparatus for unloading freight cars with relatively heavy material arranged in packs, such as sheet metal, and in combination, means for supporting a pack on the floor at spaced points and with spaces provided at opposite sides of a vertical center plane extending through the pack, a device for vertically raising a pack and maintaining it lifted above its horizontal plane of transit, said device having spaced supported elements adapted to rest on the car floor at spaced points on opposite sides of a vertical center plane extending through the pack and longitudinally of the car with the points of support of the pack and lifting device being disposed one outside the other, and a secondary conveying medium adapted to receive the lifted pack from said device to convey the same through the car doorway.

9. In an apparatus for handling relatively heavy material arranged in packs, such as sheet metal, and in combination, means for supporting a pack on a floor at spaced points and spaced above the floor with spaces provided at opposite sides of a vertical center plane extending through the pack, a device for vertically raising a pack and maintaining it lifted above its horizontal plane of transit, said device having spaced supporting elements adapted to rest on the car floor in spaces at opposite sides of a vertical center plane extending through the pack, and in the same transverse plane of the car with the pack, and a secondary conveying medium adapted to receive a pack from said device to convey the same through the car doorway, said conveying medium being adapted to be arranged beneath the pack lifted by said device.

10. In an apparatus for handling relatively heavy material arranged in packs, such as sheet metal, and in combination, means for supporting a pack on a floor at spaced points with spaces provided at opposite sides of a vertical center plane extending through the pack, a device for vertically raising and lowering a pack and maintaining it lifted above its position on the floor during transit, said device having spaced supporting elements adapted to rest on the car floor in spaces at opposite sides of a vertical center plane extending through the pack and longitudinally of the car and in the same transverse plane of the car with the pack, and a secondary conveying medium adapted to receive a lifted pack from said device to convey the same through the car doorway.

11. In an apparatus for handling relatively heavy material bound together in packs, such as sheet metal, and in combination, a device for vertically raising and lowering a pack and maintaining it lifted above its plane of transit in a car, said device having spaced supporting elements adapted to rest on the floor of a car on opposite sides of a pack, and a secondary conveying medium adapted to receive a pack from said device to transport the same through a car doorway, said conveying medium being adapted to be disposed beneath the pack supported in spaced relation to the car floor by said lifting device.

12. In an apparatus for holding relatively heavy material bound together in packs, such as sheet metal, and in combination, a device for vertically raising and lowering a pack and maintaining it lifted above its plane of transit in a car, said device having spaced supporting elements adapted to rest on the floor of a car on opposite sides of a pack and spanning the same, and a secondary conveying medium adapted to receive a pack from said device to transport the same through a car doorway, said conveying medium being adapted to be disposed beneath the pack supported in spaced relation to the car floor by said lifting device.

13. In an apparatus for handling relatively heavy material bound together in packs such as sheet metal, and in combination, a device for vertically raising and lowering a pack and maintaining it lifted above its plane of transit in a car, said device having spaced supporting elements adapted to rest on the floor of a car on opposite sides of a pack and spanning the same thereabove, and a secondary conveying medium adapted to receive a lifted pack from said device to transport the same through a car doorway.

14. In an apparatus for handling relatively heavy material bound together in packs such as sheet metal, and in combination, a device for vertically raising and lowering a pack and maintaining it lifted above its position of transit in a car, said device having spaced supporting elements adapted to rest on the floor of a car at spaced points at opposite sides of a vertical plane extending through the center of a pack and immediately in the vicinity of the pack, secondary conveying medium adapted to receive a pack from said device to transport the same through a car doorway, said secondary conveying medium consisting of a self-propelled truck having a lift platform.

15. In an apparatus for handling relatively heavy material bound together in packs, such as sheet metal, and in combination, a device for vertically raising and lowering a pack and maintaining it lifted above its position of transit in a car, said device having spaced supporting elements adapted to rest on the floor of a car at spaced points at opposite sides of a vertical plane extending through the center of a pack and in the immediate vicinity of the pack, and a secondary conveying medium adapted to be disposed beneath and to receive a lifted pack from said device to transport the same through a car doorway, said secondary conveying medium consisting of a self-propelled truck having a lift platform.

16. In an apparatus for handling relatively heavy material bound together in packs, such as sheet metal, and in combination, a device for vertically raising and lowering a pack and maintaining it lifted above its position of transit in a car, said device having spaced supporting elements adapted to rest on the floor of a car at spaced points at opposite sides of a vertical plane extending through the center of a pack and in the same transverse plane of the car with the pack, and a secondary conveying medium adapted to be arranged beneath and to receive a lifted pack from said device to transport the same through a car doorway, said secondary conveying medium consisting of a self-propelled truck having a lift platform.

17. In an apparatus for handling relatively heavy material arranged in packs, such as sheet metal, and in combination, means for supporting a pack on a floor at spaced points and spaced above the floor to provide spaces at opposite sides of the vertical center plane extending through the pack, a device for vertically raising and lowering a pack and maintaining it lifted above its position on the floor during transit, said device having spaced supporting elements adapted to rest on the car floor in spaces at opposite sides of the pack, and a secondary conveying medium adapted to receive a pack from said device to convey the same through the car doorway, said secondary conveying medium consisting of a self-propelled truck having a lift platform.

18. In an apparatus for handling relatively heavy material arranged in packs, such as sheet metal, and in combination, a device for vertically raising and lowering a pack and maintaining it lifted above its position of transit in a car, said device having spaced supporting elements adapted to rest on the floor of a car on opposite sides of a pack and to straddle the same, and a secondary conveying medium adapted to fit beneath and to receive a lifted pack from said device to transport the same through a car doorway, said secondary conveying medium consisting of a self-propelled truck having a lift platform.

19. In an apparatus for handling metal, the combination of means for binding the stack of metal together into a unitary bundle on the car floor and including attaching devices at opposite sides of the stack for the attachment of a lifting mechanism, a lifting device adapted to straddle opposite sides of the stack on the car floor and having mechanism cooperating with said attaching devices for lifting the stack from the floor, and means for receiving the stack from said lifting device and for conveying it from the car.

20. In an apparatus for handling metal, the combination of means for holding the constituent parts of a pack of metal against substantial relative movement on the car floor in transit, means for maintaining the pack on the car floor with longitudinal aisle spaces at the sides thereof, a stack lifter having legs adapted to be moved into said spaces to straddle the pack and having means for lifting the pack and a lift truck having a lift platform insertable beneath the pack and between said legs to receive the pack and convey it from the car.

21. Apparatus for handling relatively heavy material, such as sheet metal, comprising means for transporting a pack of material into or from within a car, means for receiving a pack from said first mentioned means in the car or presenting it to the latter in the car, said second means having spaced supporting elements adapted to be disposed on a car floor at opposite sides of a vertical plane extending through the center of the pack and mechanism whereby the pack so received from the first mentioned means may be raised and lowered in the car.

22. Apparatus for handling relatively heavy material arranged in packs or units in a car, comprising means for raising the pack from its support on the car floor, said means having spaced points of support on the car floor disposed on opposite sides of a vertical plane extending through the pack, and independent means for horizontally conveying a lifted pack to effect its transportation through the car door.

23. Apparatus for handling relatively heavy material comprising means for maintaining the pack substantially intact during transit, means for raising the pack from its support on the car floor through a connection with said first mentioned means, said raising means having spaced points of support on the car floor disposed on opposite sides of a vertical plane extending through the pack and in the immediate vicinity thereof, and means for horizontally conveying a lifted pack to effect its transportation through the car door.

24. Apparatus for handling relatively heavy material arranged in packs or units in a car, comprising means for maintaining the pack substantially intact during transit, means for raising the pack from its support on the car floor through a connection with said first mentioned means, said raising means having spaced points of support on the car floor disposed on opposite sides of a vertical plane extending through the pack and in the same transverse plane of the car with the pack, and means for horizontally conveying a lifted pack to effect its transportation through the car door.

25. Apparatus for handling relatively heavy material arranged in packs or units in a car, comprising means for maintaining the pack substantially intact during transit, means for raising the pack from its support on the car floor through a connection with said first mentioned means, said raising means having spaced points of support on the car floor disposed on opposite sides of a vertical plane extending through the pack, and means for horizontally conveying a lifted pack to effect its transportation through the car door.

In testimony whereof I affix my signature.

ROBERT T. ROMINE.